United States Patent [19]

Mack

[11] Patent Number: 4,596,041

[45] Date of Patent: Jun. 17, 1986

[54] PARTICIPANT-IDENTIFICATION RECORDING AND PLAYBACK SYSTEM

[76] Inventor: John L. Mack, 4638 S. 30th Rd., Arlington, Va. 22206

[21] Appl. No.: 505,442

[22] Filed: Jun. 17, 1983

[51] Int. Cl.$^4$ .......................... H04B 1/00; H04B 7/00
[52] U.S. Cl. .......................................... 455/53; 455/2; 455/67; 381/42; 360/13; 369/7; 340/870.11
[58] Field of Search ...................... 455/2, 3, 5, 49, 53, 455/50, 67; 358/84; 381/42; 360/12, 13, 29, 30; 369/6, 7, 25, 29; 434/320, 350, 351; 340/870.11, 870.12; 179/2 E, 18 BC; 370/57, 73, 122

[56] References Cited

U.S. PATENT DOCUMENTS

| | | | |
|---|---|---|---|
| 2,668,283 | 2/1954 | Mullin | 360/29 |
| 2,904,682 | 9/1959 | Rawlins . | |
| 3,058,065 | 10/1962 | Freeman et al. | 455/2 |
| 3,122,847 | 3/1964 | Redfield et al. | 455/5 |
| 3,587,077 | 6/1971 | Kaldor et al. | 455/2 |
| 3,673,331 | 6/1972 | Hair et al. | 381/42 |
| 3,879,751 | 4/1975 | Gimelli | 360/13 |
| 4,109,104 | 8/1978 | Toyoshima | 381/42 |
| 4,345,334 | 8/1982 | Nordahl | 455/50 |

*Primary Examiner*—Jin F. Ng
*Attorney, Agent, or Firm*—James R. Gaffey

[57] ABSTRACT

A participant-identification, recording and playback system includes a plurality of radio transmitters, preferably FM transmitters, which are tuned to respectively different center frequencies, and serve as respective wireless microphones assigned to respective participants. A radio receiver which is operatively associated with a recording and playback system is provided to receive signals from all of the wireless microphones, reduce these to a plurality of IF signal and record the same. The playback portion of the system includes a plurality of demodulators which allows one to recover all the audio signals on a selective basis for transcription. Circuitry is provided to identify the speakers and to indicate start and stop times.

6 Claims, 3 Drawing Figures

PARTICIPANT-IDENTIFICATION RECORDING AND PLAYBACK SYSTEM

BACKGROUND OF THE INVENTION

1. Field of the Invention

This invention relates to a participant-identification recording and playback system which is especially useful for recording and subsequently transcribing conferences and the like. More particularly, the present invention concerns a participant-identification recording and playback system which can be utilized in conjunction with wireless microphones.

2. Description of the Prior Art

Transcripts of conferences, hearings, administrative and judicial proceedings, as well as informal discussions are often required. In the past, and to a considerable extent today, a reporter either by hand or with aid of a stenotype machine transcribes the spoken words as each participant speaks, identifying the respective speakers by sight or requiring them to identify themselves verbally before proceeding with the discussion or testimony on the merits. These particular techniques often result not only in errors in the text of the transcript, but errors in the identification of the individual speakers. Furthermore, the costs are high because of the necessity of having a reporter present during the conference, as well as later when the verbatim transcript is produced. Moreover, the need for identification of the individual speaker each time he or she speaks and the requirement that only one person speak at a given time for the sake of improved accuracy, tends to structure the discussion so that continuity and the free flowing of discussion from one speaker to the next and among the speakers cannot take place. Spontaneity is lost, in spite of the fact that it is desirable in many instances.

In general, simply recording the discussion for latter transcription by the reporter is not satisfactory. Among other shortcomings, the reporter, when working from a raw audio recording of a discussion or conference, may find it extremely difficult, and in many cases impossible, to identify the individual speakers from among the participants. This is especially troublesome when more than one individual may be speaking or attempting to speak during the same period of time.

Another approach, often used during formal hearings before administrative agencies, legislative bodies, city councils and the like, requires the reporter to wear a mask-like device which includes a microphone into which he speaks constantly during a hearing, repeating the words of the respective speakers and identifying the speakers themselves, the voice of the reporter being recorded and providing a basis for later transcription by the reporter. This particularly technique, while suitable in many instances, suffers from the shortcomings mentioned above to one degree or another.

It is known from the U.S. Pat. No. 4,345,334 to John G. Nordahl granted Aug. 17, 1982 and entitled "Reduced Cross Talk Telemetry System and Method of Manufacture Thereof" to provide a telemetering system which involves a plurality of radio transmitters associated with respective individuals, the assigned frequency differing for each individual. The radio transmitters are provided with transducers for inputing physiological data to the respective transmitters, the respective transmitters transmitting to a central receiver which includes a radio frequency tuning section and a detector, the detector serving a demodulate the respective incoming signals to output physiological data for processing and display.

It has been proposed in the U.S. Pat. No. 3,122,847 to Robert H. Redfield et al. entitled "Electronic Teaching Device" and granted Mar. 3, 1964 to incorporate into a classroom a plurality of transceivers, each associated with a microphone, so that a teacher may communicate with each student and receive verbal communication from the students via the radio links provided between the teacher's transceiver and each of the students" transceivers.

It is known from U.S. Pat. No. 2,982,483 to Donald J. Pando granted Sept. 28, 1976 and entitled "Communications Device Arranged to Worn in Intimate Contact with the Body of the User" to utilize a communication device which includes a strap in intimate contact with a user's body, a transmitter and receiver being incorporated into the strap and including respectively a microphone and earphone.

Of interest as showing the general background of the present invention, reference is made to a number of U.S. Pat. Nos. identified as follows:
No. 3,122,847, Redfield et al., Mar. 3, 1964;
No. 3,157,871, Umanoff, Nov. 17, 1964;
No. 3,529,243, Reindl, Sept. 15, 1970;
No. 4,162,449, Bouyssounose et al., July 24, 1979.

SUMMARY OF THE INVENTION

An object of the present invention is to provide a participant-identification, recording and playback system which provides for speaker identification of the individual participants without conscious effort of the speakers.

An additional object of the present invention is to provide a participant-identification, recording and playback system which not only identifies the respective participants when they are speaking but allows a reporter to check the transcript against a recording of the spoken words which includes participant-identifying data.

A further object of the present invention is to provide a participant-identification, recording and playback system which allows the participants to engage in free-flowing discussions without a need to identify themselves verbally when they speak yet allows a reporter to provide a verbatim transcript including identification of the speakers.

Yet another object is to provide participant-identification, recording and playback system which can be utilized in conjunction with wireless microphones while making it possible to identify the individual speakers from among the participants.

The foregoing objects, as well as others which are to become clear from the text below, are achieved in accordance with the present invention by providing a participant-identification, recording and playback system which includes a plurality of radio transmitters, preferably FM transmitters each set or settable to a respectively different carrier frequency, and a radio receiver which is operatively associated with a recording and playback system which allows a reporter or the like to identify each speaker from among the participants at a hearing or conference or the like, without a need for each participant to identify himself, and provide a verbatim transcript.

DETAILED DESCRIPTION OF THE PREFERRED EMBODIMENTS

Figure 1:
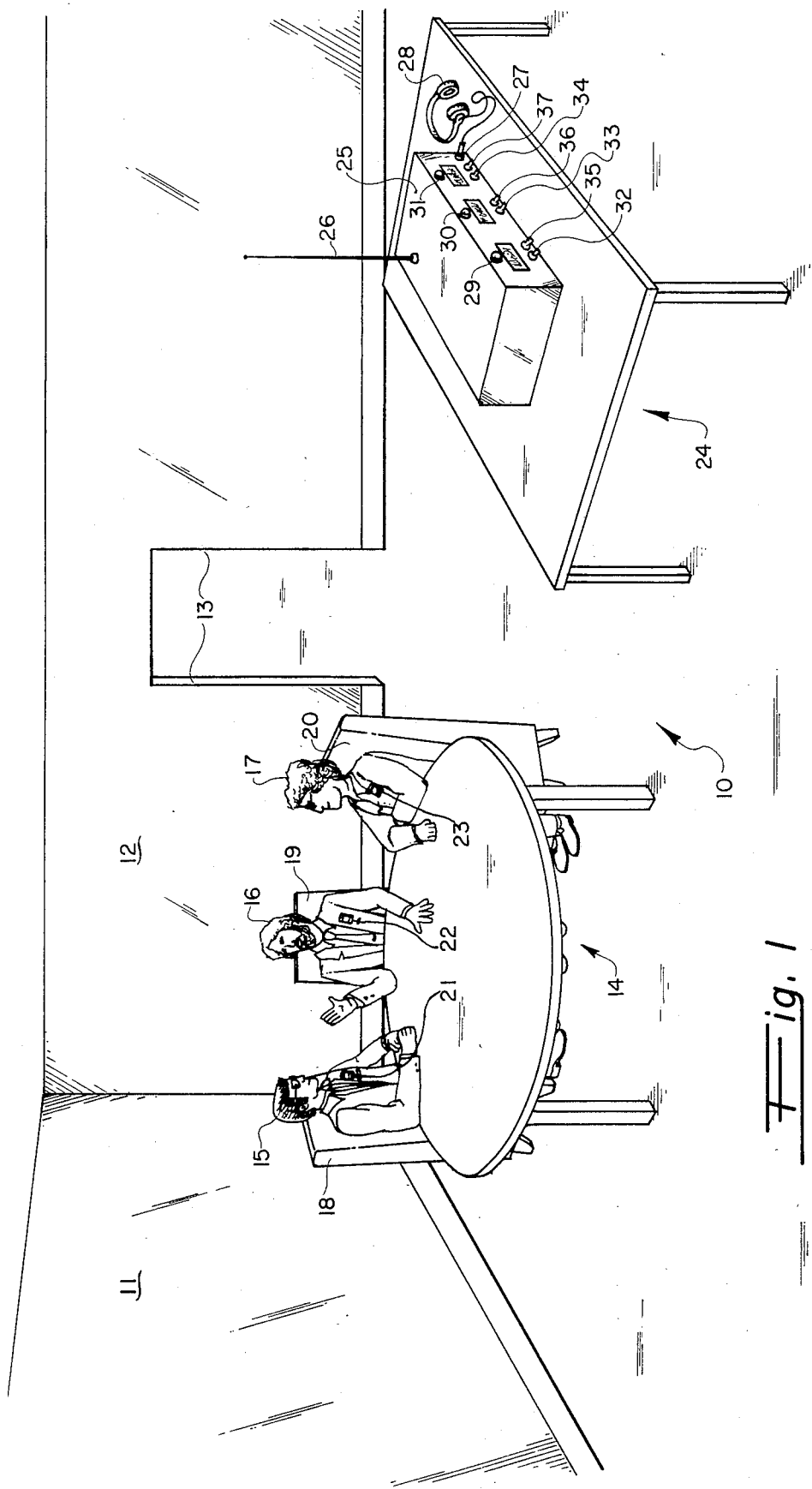
FIG. 1. is an illustration of a portion of a conference room, showing the disposition or a number of participants, provided with respective wireless microphones, and a receiver-recorder suitable for practicing the present invention.

Referring to FIG. 1, a small conference room is indicated generally by the reference numeral 10. As shown, the conference room 10 includes adjacent and abutting sidewalls 11, 12, the sidewall 12 having a doorway 13 therein. A circular conference table 14 upon which conference material, notepaper, pencils and the like may be placed is provided, plurality of participants may be seated about the circular conference table 14. For the purpose of illustration, three participants 15-17 are shown seated on respective chairs 18-20. Each of the individual participants 15-17 is provided with a respective cordless microphone, respectively illustrated as so-called lapel microphones 21-23. It is to be appreciated that other types of cordless microphones could be provided instead of the lapel microphones 21-23 illustrated. For example, the microphones could be cordless microphones individually positioned on the tabletop of the table 14, each one of them being positioned nearest to a selected one of the participants 15-17 and having directional characteristics so as to reduce the possibility of picking up high levels of sound energy from other than the participant to whom the respective microphone is to be associated. Another type cordless microphone which could be utilized in practicing the present invention is a throat microphone which would function as well, but would not be quite as natural feeling as the proposed lapel microphone and yet would allow participants to move about better than table-top microphones. From an electronic point of view, a suitable cordless microphone could consist of an individually tunable FM transmitter preferably with a threshold circuit and a voice-actuated gate. A second table 24 is provided in the conference room 10. A radio receiver 25 is shown in position on the table top of the table 24; of course, the radio receiver 25 could be positioned at a more remote place, such as in another room or building. The radio receiver 25 is provided with an antenna 26 which is broadly enough tuned, as is the radio frequency circuitry within the receiver 25, to receive simultaneously the respective RF output signals from the transmitters within the cordless microphones 21-23. The receiver 25 includes a recording and playback system which can record the signals received from the transmitters associated with the respective cordless microphones 21-23, the receiver 25 as illustrated including a female plug 27 into which a male plug may be positioned so as to allow a reporter to listen to a playback from the recording and playback system of the receiver 25. A pair of earphones 28, which are to be worn by the reporter, are provided. The reporter with the aid of a typewriter can type a full or partial transcript of a discussion from the recordings made during conferences or check the draft transcript were one made from the reporter's notes or use a keyboard to provide input to a word processor, microcomputer or the like. A plurality of color signal lights 29-31 may be provided on the front panel of the receiver 25 so as to provide indications of the respective participants from among the participants 15-17. In some instances, signs having the text of individual participants names may be positioned beneath the respective lights 29-31 or such signs may replace the lights 29-31, in which case these would be illuminated by respective light sources. Also provided on the front panel of the receiver 25 are two pluralities of toggles 32-34 and 35-37 which are operatively associated with switches within the receiver 25 to be discussed below in conjunction with FIG. 3.

Figure 2:
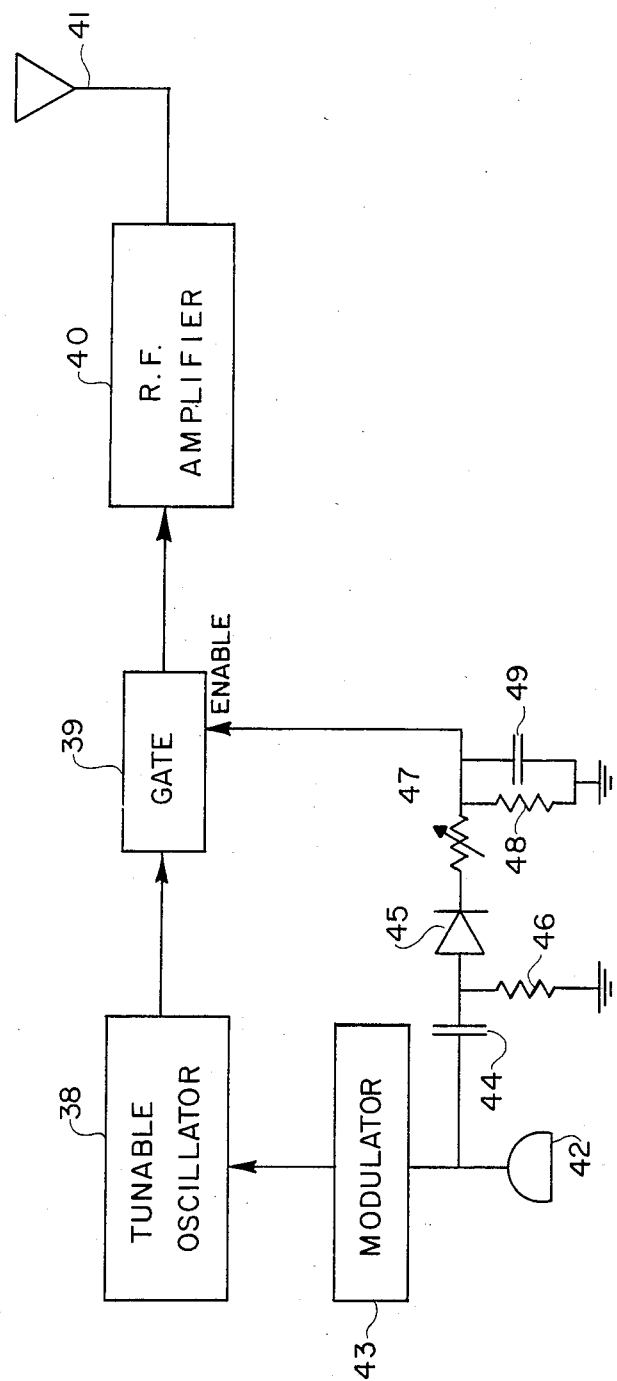
FIG. 2 is a schematic, block diagram of a radio transmitter which constitutes a wireless microphone and which may be utilized in an exemplary, preferred embodiment of a participant-identification, recording and playback system constructed according to the present invention.
Figure 3:
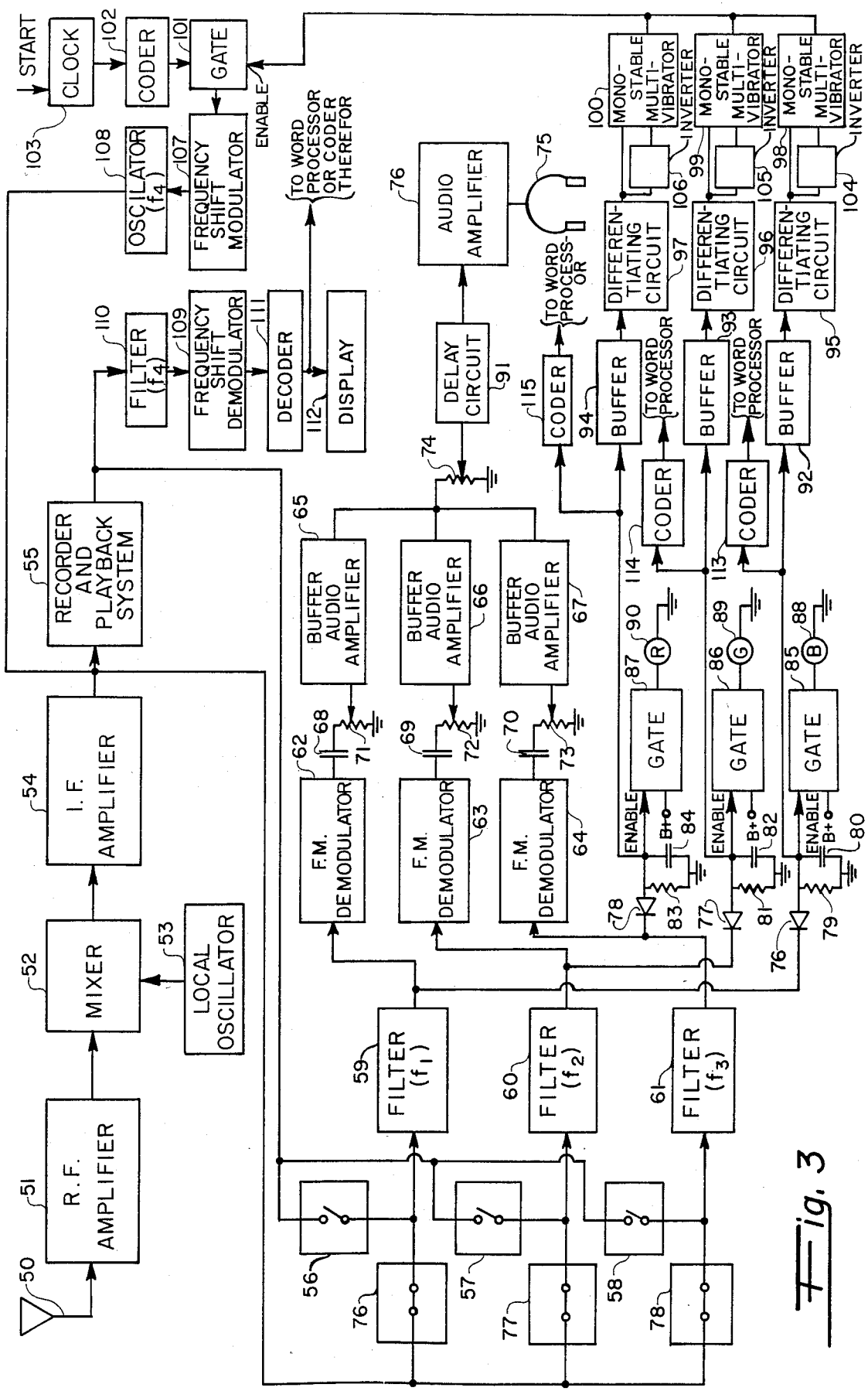
FIG. 3 is a schematic, block diagram of a radio receiver recording and playback apparatus which may be utilized in the exemplary, perferred embodiment of the participant-identification, recording and playback system according to the present invention in operative association with a plurality of the radio transmitters of FIG. 2.

The preferred, exemplary embodiment of a participant-identification, recording and playback system according to the present invention may include a frequency modulation (FM) radio receiver, which includes a recording and playback system, as illustrated in FIG. 3, and a plurality of frequency modulation (FM) transmitters as illustrated in FIG. 2 and which constitute the cordless microphones.

Turning to FIG. 2, the respective cordless microphones (21-23, FIG. 1) each includes a tuneable oscillator 38 which is coupled, via an analog gate 39, to a radio frequency (RF) amplifier 40 which is also tuneable, so as to have its center frequency tracked with the center frequency of the oscillator 38, or is of sufficiently broad bandpass to amplify all frequencies which the oscillator 38 is to produce. The output from the RF amplifier 40 is fed to an antenna 41.

A sound-to-voltage transducer 42, essentially a conventional microphone, is operatively associated with a modulator 43 which frequency modulates the tuneable oscillator 38 about its adjustable center frequency. A portion of the energy produced by the sound-to-voltage transducer 42 is fed, via a coupling capacitor 44, to a rectifier 45, this voltage appearing as a voltage across a resistor 46. The rectifier 46 has its cathode connected, via a variable resistance 47, to a relatively long time constant RC circuit illustrated as parallel connected resistor 48 and capacitor 49. The variable resistance 46, which is to be adjusted by persons using the microphones, sets an audio threshold (volume) level above which one must speak in order for the gate 39 to be enabled and thus allow a feeding of the modulated output from the oscillator 38 to the RF amplifier 40.

The time constant of the RC circuit constituted by the resistor 48 and the capacitor 49 is desirably such that an enable signal is produced and fed to the enabling input of the gate 39 during short pauses between syllables, words, sentences and the like as well as during periods when the transducer 42 has an output, but not long enough to enable the gate 38 for any significant length of time after a participant stops speaking. The actual time constant could be adjusted simply by making the resistor 48 a variable, settable resistance were participants" individual speaking habits to make this desirable. The variable resistance 47 is settable so as to establish a volume threshold level of input which must be exceeded before an enable signal is produced and applied to the enabling input of the gate 39. In practice the value of the resistance 47, relative to the value of the resistor 48, is set to exclude the production of an enable signal to the gate 39 when persons speak who are seated to the sides or near the participant to which the specific cordless microphone is assigned. This assures that only speaking by the person to whom a given microphone (21-23, FIG. 1) is assigned will produce a sufficient acoustic energy level to, in effect, gate on that person's assigned microphone.

The radio receiver 25 (FIG. 1) in the illustrated, exemplary embodiment of a system according to the present invention includes, as shown in FIG. 3, an antenna 50 which receives the radio frequency signals from the respective antennas 41 (FIG. 2) associated with each of the cordless microphones 21-23 (FIG. 1). The antenna 50 is coupled to a broad bandpass, radio frequency (RF) amplifier 51 which simultaneously amplifies all of the RF signals received from all of the cordless microphones 21-23 (FIG. 1), its output being coupled to a mixer 52 which has a second input from a local oscillator 53. The output of the mixer 52 is coupled to an intermediate frequency (IF) amplifier 54 which amplifies the difference frequency signals produced by the mixer 52, one particular different selected set center frequency for each of the cordless microphones 21-23 (FIG. 1) being produced, one for each participant. It is to be appreciated that the bandpass of the IF amplifier must be broad. The bandpass of the IF amplifier 54 must be sufficient to pass one center frequency signal for each of the channels defined by the respective cordless microphones 21-23 (FIG. 1), the maximum and minimum center frequencies, as well as modulation swings, being taken into account.

The IF signals from the amplifier 54 are fed to a recorder and playback system 55 which effects the recording on a single track all of the IF signals from the IF amplifier 54, the frequency response of the recording and playback heads, as well as that of the recording medium, which may be magnetic tape, a disk or the like, must be sufficient to assure that all the IF signals are recorded and can be retrieved.

The playback output from the recorder and playback systems 55 is coupled, via a plurality of respective switches 56-58, to respective filters 59-61 tuned to a respective center IF frequencies designated $f_1$-$f_3$, respectively, one for each of the plurality of cordless microphones 21-23 (FIG. 1). The filters 59-61 should be tuneable so as to pass respectively the respective IF signals produced by the mixer 52. The outputs from the filters 59-61 are fed to respective frequency modulation (FM) demodulators 62-64 which demodulate the respective IF signals passed by the respective filters 59-61, their respective audio outputs being coupled to respective buffer audio amplifiers 65-67 via respective coupling capacitors 68-70 and respective volume-balancing potentiometers 71-73.

The audio outputs from the buffer audio amplifiers 65-67 are fed to a linear mixer illustrated as a potentiometer 74 and thence to a pair of earphones 75, which are to be worn by a reporter, via an audio amplifier 76.

The outputs from the respective filters 59-61 are also fed to respective rectifiers 76-78 having their respective cathodes connected to a voltage reference point (ground) via respective long time constant RC circuits defined respectively by a resistor 79 and a capacitor 80, a resistor 81 and a capacitor 82, and a resistor 83 and a capacitor 84 so as to develop respective control voltages across the respective capacitors 80, 82 and 84, these being fed respectively to analog gates 85-87 as respective enabling signals which allow, when present, B+ voltage to be supplied to respective lamps 88-90, each of which is connected to reference ground (B-). The respective lamps 88-90 are labled respectively, R for red, G for green and B for blue. It is to be understood that these lamps 88-90 supply light for the signal lights 29-31 (FIG. 1) and need not be colored if associated with adjacent text placed on the face of the receiver 25 (FIG. 1) setting out the individual names of the participants.

As illustrated, the IF amplifier 54 has a second output which may be coupled, via respective switches 76-78, directly to the filters 59-61. This allows a reporter to listen, and if desired, to transcribe a selected one, some or all of the participants during an ongoing conference, either later playing back the outputs from the recorder and playback system 55 to check on accuracy or to fill in blanks. It is preferred that the individual switches 56-58 and 76-78 be individually actuated, by manipulating toggles 32-37 (FIG. 2) so that the reporter may select one, some or all of the channels to listen to at one time, providing considerable flexibility in transcription and in checking and rechecking which leads to an accurate verbatim transcript. A time delay, for example a three second delay, is provided by a delay circuit 91 in circuit between the volume control potentiometer 74 and the audio amplifier 76.

It is to be appreciated that the system as thus far described, without the delay circuit 91, is completely operable. The purpose of the delay circuit 91 is to allow the audio portion of the playback to be sufficiently delayed so that time signals, which are also recorded on the recording medium whenever any one of the participants either starts to speak or stops speaking, can be played back immediately before the individual participants start to speak and immediately before the individual stop speaking.

In order to develop control signals, which are to be used to gate the time signals to the recorder and playback system 55, respective buffer amplifiers 92-94 are connected between the respective rectifying diodes 76-78 and respective differentiating circuits 95-97 which differentiate the d.c. voltages which represent the envelopes of the I.F. signals passed by the respective filters 59-61. The output signals from the differentiating circuits 95-97 are, as illustrated positive and negative going spikes which are indicators respectively as the starting and ending points of the respective participants' periods of speaking.

The positive-going spikes are used to cause respective monostable multivibrators 98-100 to go to their unstable states, the time period in the unstable state being sufficiently long to develop an enable signal of predetermined lengths from their outputs to enable a gate 101 which allows the passage of a binary time signal from a coder 102 directly to the recorder playback system 55 where it is recorded a series of binary bits. The coder 102 has its input provided from a clock 103 which includes a START input if the reporter wishes the time signals to be on an arbitrary base or may reflect real time, as does the clock in conventional digital watches.

In order to develop enable signals to the gate 101 when any particpant stops speaking, inverters 98-100 are provided between the respective differentiating circuits 92-94 and the monostable multibrators 98-100.

The output from the gate 101, which is a series of pulses reflecting a binary signal representation of time, is fed to a frequency shift modulator 107 which modulates a high frequency oscillator 108. The center frequency ($f_4$) of the oscillator 108 is different from the frequencies of the I.F. signals received from the amplifier 54, but is of the same order. The center frequency ($f_4$) is shifted upwardly to a higher frequency ($f_5$) to represent a ONE and downardly to frequency ($f_6$) to represent a ZERO.

During playback, the frequency shifted modulated signal carrying binary time information is fed to an frequency shift modulation demodulator 109 which may be a conventional slope detector, via a bandpass filter 110 which passes the frequencies $f_4$–$f_6$, while rejecting signals of the frequencies $f_1$–$f_3$. The output from the demodulator 109 is fed to a decoder 111 which has its output fed to a display 112 so as to provide an indication to the reporter of the respective times at which a participant starts to speak and stops speaking. It is to be appreciated that the output from the demodulator 109 could alternatively or contemporaneously be fed to a microcomputer or word processor or the like which has been programmed to sort "by time" and has a memory in which the time signals can be stored in binary form. In this case, the identity of the speakers could be fed to and stored in the word processor as well simply by using the respective outputs from the diodes 76–78 to produce via respective coders 113–115 for example coded binary signals indicative of the identity of the speakers.

It is to be appreciated that foregoing discussion and accompanying drawings relate to an embodiment of the present invention which is set out by way of example, not by way of limitation. Numerous and other embodiments are possible without departing from the spirit and scope of the invention, its scope being defined by the appended claims.

What is claimed is:

1. A participant-identification recording and playback system comprising a plurality of wireless microphones, each of said microphone including a respective radio transmitter for broadcasting a respective signal modulated with a respective audio signal representing speech of a respective participant and a distinctive participant-identification signal; radio receiving means responsive to signals received from said radio transmitters for producing output signals which include signals carrying respective modulation representing speech of respective participants and respective signal characteristics representing identity of respective participants; recording and playback means for recording and playing back the output signals; means responsive to output from said recording and playback means for deriving audio signals therefrom representative of speech signals of respective participants and signals identifying respective participants; means for producing time signals and means responsive to said output signals from said receiving means for feeding the time signals to said recording and playback means whenever any participant starts to speak and whenever any participant stops speaking.

2. A system according to claim 1, wherein said radio transmitters are FM transmitters, each set to a distinctly different center frequency.

3. A system according to claim 2, wherein said radio receiving means comprises a FM receiver, said FM receiver producing a respective IF signal for each respective radio transmitter, respective center frequencies thereof constituting the respective signal characteristics representing identity of respective participants and the FM modulation thereon representing speech of respective participants.

4. A system according to claim 1, including, as part of said means responsive to output from said recording and playback means, amplitude demodulating means for deriving respective d.c. signals indicative of identities of respective participants.

5. A system according to claim 4, including a plurality of controlled gates, a plurality of distinctive light sources, each said light source being coupled to a power source via a respective gate of said plurality of gates, and each gate being responsive to a respective one of said d.c. signals derived from said amplitude demodulating means.

6. A system according to claim 1, including means for delaying the audio signals derived from the output from said recording and playback means with respect to the signals derived from the output from said recording and playback means identifying respective participants upon playback.

* * * * *